Figure 1:
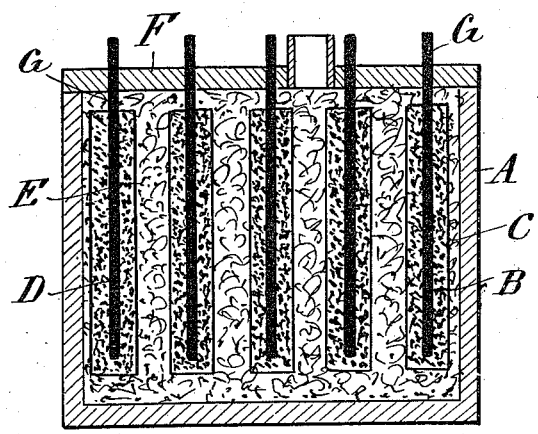

Patented Mar. 11, 1924.

1,486,430

UNITED STATES PATENT OFFICE.

KAJ HANSEN, OF COPENHAGEN, DENMARK.

ELECTRIC ACCUMULATOR.

Application filed November 5, 1921. Serial No. 513,047.

*To all whom it may concern:*

Be it known that I, KAJ HANSEN, a subject of the Kingdom of Denmark, and residing at Copenhagen, Denmark, have invented certain new and useful Improvements in an Electric Accumulator, of which the following is a specification.

The present invention relates to an electric accumulator or storage battery and one object of the invention is to construct such an accumulator which will be particularly adapted to withstand jarring, shock and vibration and which, has a great capacity in proportion to its size and weight.

This is accomplished according to the invention, in that the electrodes consist of granulated lead or an oxide of lead contained in porous coverings made of linen, asbestos or the like, the spaces between the complete electrodes being filled up with a substance wherein the electrolyte may be absorbed. Such substance may for example be glass-wool or the like.

The loose granulated lead is filled into bags of linen or the like together with grid-like plates of lead or lead alloy, so that the lead granules surround the plates which latter form conductors for the electrode mass. The linen bags with their contents are then placed in the cell or container and the space between them being filled up with glass-wool or the like. This material is subjected to a high mechanical pressure so that the glass-wool mass will form a compressed mass.

With this construction the completed accumulator can stand great shock without injury while the mechanical pressure on the electrode absorbing mass tends to produce an intimate contact between the separate grains of the electrode-mass and the central grid-like plates.

This construction permits the rapid manufacture of an accumulator of great capacity and at a minimum cost of production.

In the drawing a constructional form for the invention is shown, where

Figure 2:
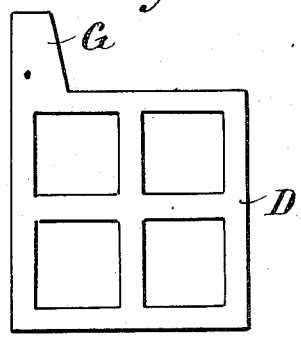

Fig. 1 shows a vertical section through an accumulator constructed according to the invention, while Fig. 2 shows a support-plate for one of the electrodes.

A is the containing vessel, which may be constructed of any suitable acid-proof material and which is preferably constructed as strong as possible, because it must be able to resist the rather high pressure used during the compressing of the contents of the accumulator. The containing vessel is closed at the top by means of the cover F or in any other suitable manner, wherein suitable openings are provided, through which the gases formed during the charging process may escape.

The electrodes, which in well known manner are placed adjacent each other, consist of a granulated mass B made of lead granules and contained in porous coverings or bags C made of linen, asbestos or the like. The electrode thus formed is supported by means of a plate D made of lead or a suitable alloy as for example a lead-antimony alloy, said plate D serving at the same time as a terminal conductor for the electrode.

As the plate D does not take any part in the chemical changes in the accumulator, but only serves as support and conductor for the electrode, it is not necessary to construct said plate solid, but it may be formed as a grid as shown in Fig. 2. That part G of the plate which projects outside the covering C is preferably made quite thick to take care of the chemical attack of the electrolyte.

The electrodes are held a suitable distance apart from each other and supported in place by filling the spaces between the electrodes with glass-wool or a like substance E, which besides is employed to fill up the whole interior of the accumulator. The necessary electrolyte is absorbed by this material.

Due to the compression to which the contents of the container have been subjected, the lead granules "grow" into one another and together with the lead grid-like plates so as to form a coherent and solid electrode with a very large surface.

The cover if not acid proof will eventually be destroyed by the acid electrolyte, but this does not take place until after the electrode mass has been formed, the object of the coverings being merely to contain the at first loose lead granules between the placing of the electrodes in the container and until the lead granules by the forming and pressing of the accumulator have "grown" together.

Glass-wool has been found especially adapted as the substance between the electrodes because owing to the high pressure found necessary to obtain the characteristic "growing" together of the lead granules, it is necessary that the substance be able to produce an elastic pressure. Glass-wool is also decidedly porous even under high pressure, so that the electrical resistance of the accumulator is not materially increased due to the filling of glass-wool. Under former constructions of storage batteries, it has usually been customary to provide one more negative plate than there were positive plates due to the tendency of the plates to bulge. Under such constructions the outside plates were each negative. According to this invention it is found desirable to make both the outside plates positive, thus providing for one more positive plate than negative.

Having thus described one form of my invention, what I desire to secure by Letters Patent is:

1. An electric accumulator comprising electrodes formed of granulated lead particles, and having glass-wool under pressure filling the spaces between the electrodes and absorbing the electrolyte, whereby the granules of the electrodes are subjected to a high mechanical pressure.

2. An electric accumulator wherein the electrodes comprise linen bags, a mass of granulated lead particles within said bags, and a porous elastic material under pressure filling the spaces between the bags, and absorbing the electrolyte, whereby the granules of the electrodes within the linen bags are subjected to a high mechanical pressure.

3. An electric accumulator as set forth in claim 1, wherein linen bags surround and contain the lead particles.

4. An electric accumulator as set forth in claim 1, wherein grid-like plates of plumbic material forming terminal conductors for the electrodes, are inserted within and surrounded by, the lead particles.

5. An electric accumulator as set forth in claim 1, in which the number of positive electrodes is one greater than the number of negative electrodes.

In testimony whereof I affix my signature.

KAJ HANSEN.